United States Patent
Vardharajan

(10) Patent No.: US 11,420,645 B2
(45) Date of Patent: Aug. 23, 2022

(54) METHOD AND APPARATUS FOR PERSONALIZING AUTONOMOUS TRANSPORTATION

(71) Applicant: AT&T Intellectual Property I, L.P., Atlanta, GA (US)

(72) Inventor: Satya B. Vardharajan, San Diego, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 69 days.

(21) Appl. No.: 16/710,593

(22) Filed: Dec. 11, 2019

(65) Prior Publication Data

US 2021/0179125 A1   Jun. 17, 2021

(51) Int. Cl.
| | |
|---|---|
| *B60W 50/08* | (2020.01) |
| *B60W 40/09* | (2012.01) |
| *G05D 1/02* | (2020.01) |
| *B60W 50/10* | (2012.01) |

(52) U.S. Cl.
CPC .......... *B60W 50/085* (2013.01); *B60W 40/09* (2013.01); *B60W 50/087* (2013.01); *B60W 50/10* (2013.01); *G05D 1/0221* (2013.01)

(58) Field of Classification Search
CPC .. B60W 50/085; B60W 40/09; B60W 50/087; B60W 50/10; G05D 1/0221
See application file for complete search history.

(56) References Cited

U.S. PATENT DOCUMENTS

| | | | | |
|---|---|---|---|---|
| 9,014,915 B2* | 4/2015 | Chatterjee | ............. | B60W 30/08 701/41 |
| 9,141,112 B1* | 9/2015 | Loo | .................. | G08G 1/096866 |
| 10,054,944 B2* | 8/2018 | Jones | .................... | G05D 1/0088 |
| 2017/0138751 A1* | 5/2017 | Martyniv | ............... | G06Q 10/02 |

(Continued)

FOREIGN PATENT DOCUMENTS

| | | | | |
|---|---|---|---|---|
| CN | 107521503 A | * | 12/2017 | ............ B60W 30/12 |
| EP | 0788922 A2 | * | 8/1997 | ......... B60K 31/0066 |
| KR | 20170129539 A | * | 11/2017 | |

OTHER PUBLICATIONS

ADAS Human Factor Research (Year: 2021).*

(Continued)

*Primary Examiner* — Jeff A Burke
*Assistant Examiner* — Kyle T Johnson
(74) *Attorney, Agent, or Firm* — Guntin & Gust, PLC; Mark Wilinski

(57) ABSTRACT

Aspects of the subject disclosure may include, for example, a method including receiving, by a processing system at an autonomous vehicle including a processor, a personalized driving style profile associated with a first driver according to first driving information, wherein the personalized driving style profile includes key driving style parameter values associated with the first driver, wherein the first driving information comprises monitoring vehicle context and control information captured during a vehicle driving session, and modifying, by the processing system at the autonomous vehicle, a default driving style algorithm according to the personalized driving style profile to mimic at an autonomous vehicle a driving style of the first driver during operation of the autonomous vehicle. Other embodiments are disclosed.

20 Claims, 8 Drawing Sheets

(56) References Cited

U.S. PATENT DOCUMENTS

| | | | |
|---|---|---|---|
| 2017/0139411 A1* | 5/2017 | Hartung | G05D 1/0077 |
| 2017/0285639 A1* | 10/2017 | Jones | B60W 30/095 |
| 2018/0229737 A1* | 8/2018 | Towal | B60W 10/20 |
| 2018/0259956 A1* | 9/2018 | Kawamoto | B60W 50/0098 |
| 2018/0307228 A1* | 10/2018 | Smith | B60W 60/001 |
| 2018/0342113 A1* | 11/2018 | Kislovskiy | G08G 1/202 |
| 2019/0011931 A1* | 1/2019 | Selvam | G08G 1/202 |
| 2019/0258251 A1* | 8/2019 | Ditty | G06K 9/00805 |
| 2020/0057453 A1* | 2/2020 | Laws | B60W 10/20 |
| 2020/0062269 A1* | 2/2020 | Vardharajan | B60W 50/0098 |
| 2020/0216094 A1* | 7/2020 | Zhu | B60W 60/0013 |
| 2020/0284883 A1* | 9/2020 | Ferreira | G01S 7/4816 |
| 2021/0049385 A1* | 2/2021 | Pinto | G06K 9/00832 |
| 2021/0179125 A1* | 6/2021 | Vardharajan | B60W 60/00 |

OTHER PUBLICATIONS

Vehicle Simulation Software Research (Year: 2021).*
EP-0788922-A2 Translation (Year: 1997).*
KR-20170129539-A Translation (Year: 2017).*
CN-107521503-A Translation (Year: 2017).*

* cited by examiner

METHOD AND APPARATUS FOR PERSONALIZING AUTONOMOUS TRANSPORTATION

FIELD OF THE DISCLOSURE

The subject disclosure relates to a method and apparatus for personalizing autonomous transportation.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

Autonomous vehicles will be ubiquitous in the near future. Driverless, fully-automated (autonomous) vehicles are anticipated as an important feature in future transportation systems. Autonomous vehicles may take the form of driverless street vehicles, such as automobiles, trucks, taxis, and/or buses. Other examples of future autonomous vehicles include driverless track-based transit vehicles, such as subway trains, trams, and/or trolleys. Still other future autonomous vehicles may include pilotless boats, ships, airplanes, and/or helicopters.

Such autonomous vehicles may bring many benefits, such as improved safety, productivity, reliability, and so forth. These vehicles will likely bring benefits in the transportation arena, such as reliability, efficiency, automation and productivity. Consumer acceptance and adaptation to autonomous vehicle technology is expected to vary according to many factors. While some consumers may adapt readily, others may find it challenging to relinquish vehicular control. Building trust and confidence in autonomous vehicles is a challenge for this emerging technology.

BRIEF DESCRIPTION OF THE DRAWINGS

Reference will now be made to the accompanying drawings, which are not necessarily drawn to scale, and wherein.

DETAILED DESCRIPTION

Figure 1:
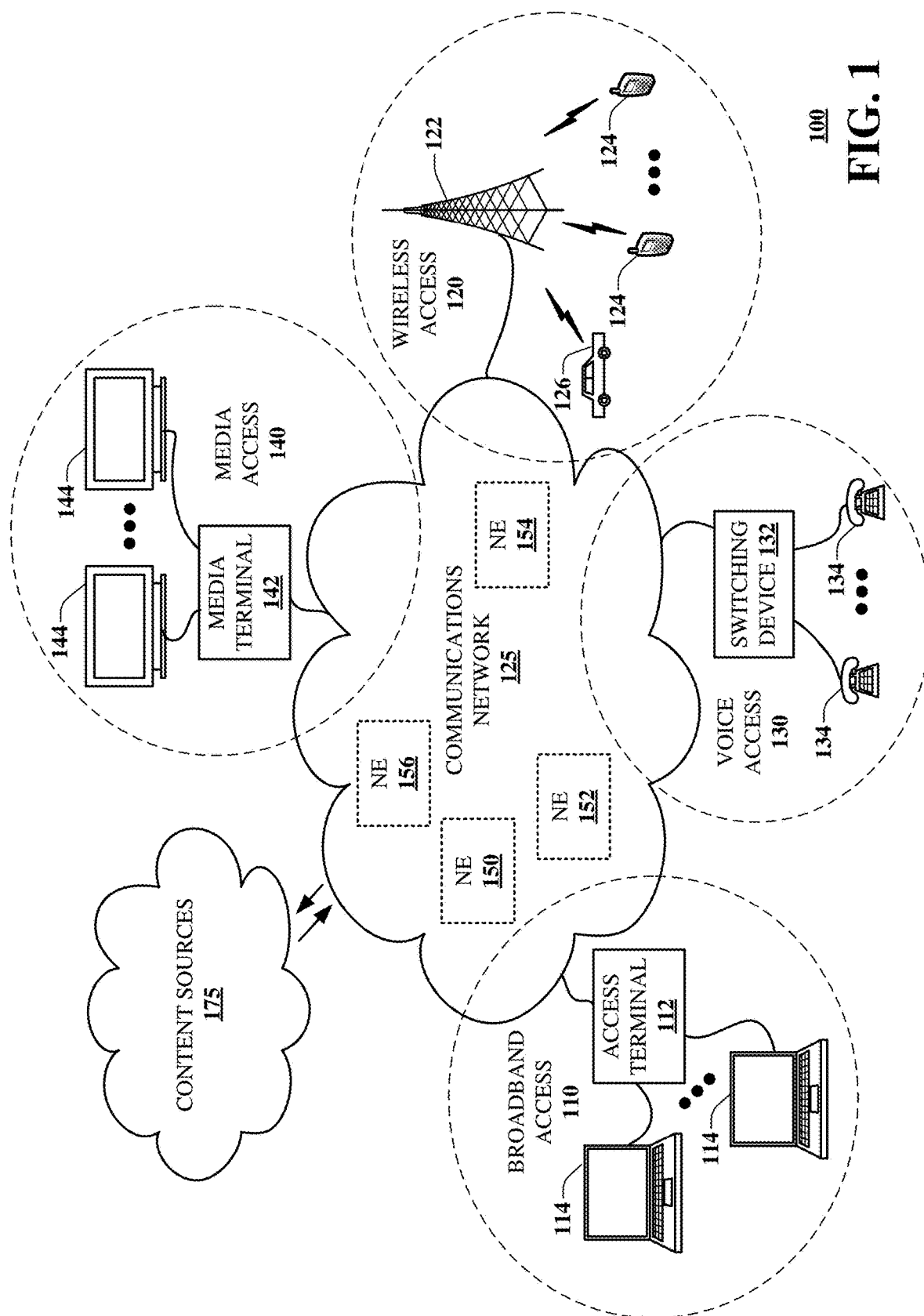
FIG. 1 is a block diagram illustrating an exemplary, non-limiting embodiment of a communications network in accordance with various aspects described herein.

The subject disclosure describes, among other things, illustrative embodiments for personalize performance of an autonomous vehicle. In various embodiments, a system can capture driving information for a driver by monitoring vehicle context and control information during a vehicle driving session. The system can generate a personalized driving style profile for the driver based on the driving information from the driving session. The system can provide the driver's personalized driving style profile to a control system of an autonomous vehicle, which can modify a default driving style profile based on the driver's profile to thereby mimic or closely replicate the driver's driving style. Other embodiments are described in the subject disclosure.

One or more aspects of the subject disclosure include a device, comprising a processing system including a processor and a memory that stores executable instructions that, when executed by the processing system, facilitate performance of operations. The operations can include capturing first driving information associated with a first driver. The capturing the first driving information can include monitoring vehicle context and control information during a vehicle driving session. The operations can also include generating a personalized driving style profile associated with the first driver according to the first driving information. The personalized driving style profile can include key driving style parameter values associated with the first driver. The operations can further include updating the personalized driving style profile according to a modification to the personalized driving style profile associated with the first driver. The modification can be received from an application at a mobile communication device. The operations can include providing the personalized driving style profile to an autonomous vehicle control system. The providing the personalized driving style profile can be via the application at the mobile communication device. The autonomous vehicle control system can modify a default driving style algorithm according to the personalized driving style profile to mimic or closely replicate an autonomous vehicle a driving style of the first driver during operation of the autonomous vehicle.

One or more aspects of the subject disclosure include a machine-readable medium, comprising executable instructions that, when executed by a processing system including a processor, facilitate performance of operations. The operations can include capturing first driving information associated with a first driver. The capturing the first driving information can include monitoring vehicle context and control information during a vehicle driving session. The operations can also include generating a personalized driving style profile associated with the first driver according to the first driving information. The personalized driving style profile can include key driving style parameter values associated with the first driver. The generating the personalized driving style profile can be via a machine learning engine. The operations can further include providing the personalized driving style profile to an autonomous vehicle control system. The providing the personalized driving style profile can be via an application at a mobile communication device associated with the first driver. The autonomous vehicle control system can modify its default driving style algorithm according to the personalized driving style profile to mimic or closely replicate at an autonomous vehicle a driving style of the first driver during operation of the autonomous vehicle.

One or more aspects of the subject disclosure include a method, performing operations via a processing system at an autonomous vehicle including a processor. The method can include receiving a personalized driving style profile associated with a first driver according to first driving information. The personalized driving style profile can include key driving style parameter values associated with the first driver. The first driving information can comprise monitoring vehicle context and control information captured during a vehicle driving session. The method can include modifying a default driving style algorithm according to the personalized driving style profile to mimic or closely replicate at an autonomous vehicle a driving style of the first driver during operation of the autonomous vehicle.

Referring now to FIG. 1, a block diagram is shown illustrating an example, non-limiting embodiment of a communications network 100 in accordance with various aspects described herein. For example, communications network 100 can facilitate, in whole or in part, capturing driving style profile information for a driver during a vehicle driving session, generating a personalized driving style profile for the first user based on the driving style profile information, and providing the personalized driving style profile to an autonomous vehicle control system to mimic or closely replicate a driving style of the driver at an autonomous vehicle. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125, which allows the autonomous vehicle to source a driver's personalized driving style profile from the cloud or from a mobile device, includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114, which can be used to view and edit a personalized driving style profile, can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124, which can carry and provide the personalized driving style profile to one or more autonomous vehicles, can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134, which can be used for viewing and/or editing a personalized driving style profile, can include traditional telephones (with or without a terminal adapter), VoIP telephones and/or other telephony devices. In one embodiment, a telephony device 134 can use voice print technology to identify and authenticate a driver for permitting editing of their personalized driving style profile.

In various embodiments, the media terminal 142 can include a cable head-end or other TV head-end, a satellite receiver, gateway or other media terminal 142. The display devices 144 can include televisions with or without a set top box, personal computers and/or other display devices. In one embodiment, the media terminal 142 can be used to view training information (e.g., videos) on how to record and generate a personalized driving style profile. In one embodiment, the media terminal 142 can be used for editing an existing personalized driving style profile.

In various embodiments, the content sources 175 include broadcast television and radio sources, video on demand platforms and streaming video and audio services platforms, one or more content data networks, data servers, web servers and other content servers, and/or other sources of media. In one embodiment, a content source 175 can provide training information on how to record and generate a personalized driving style profile.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

As described above, driverless, fully-automated (autonomous) vehicles are anticipated as an important feature in future transportation systems. Autonomous vehicles may take the form of driverless street vehicles, such as automobiles, trucks, taxis, and/or buses. Other examples of future autonomous vehicles include driverless track-based transit vehicles, such as subway trains, trams, and/or trolleys. Still other future autonomous vehicles may include pilotless boats, ships, airplanes, and/or helicopters. Such autonomous vehicles may bring many benefits, such as improved safety, productivity, reliability, and so forth.

However, autonomous vehicles can present unique challenges for passengers in these vehicles, particular for passengers, who have formerly driven or piloted similar types of vehicles. These former drivers, now autonomous vehicle passengers, face the prospect of transitioning away from known experiences of controlling their vehicles and driving experiences and/or serving as passengers in vehicles driven by other human drivers/pilots. They further face a new and unknown prospect of passively riding in vehicles totally controlled by autonomous computer systems. For some, this may be a relatively easy transition. For example, many people have experienced flying in commercial airliners, where an unseen pilot controls the airplane in a closed cockpit and, typically, uses highly-complex, computer and satellite-driven autopilot systems. Some autonomous vehicle passengers in this situation may be sufficiently conditioned to giving up control (or the perception of control) to an unseen pilot/computer combination.

However, this transition to autonomous vehicular control may be more challenging for personal vehicles, such as self-driving passenger cars and trucks, self-piloting drones, and so forth, where a large majority of future passengers of autonomous versions may be people, who are used to driving or piloting similar vehicles in similar traffic contexts. Giving over complete control of their vehicles to fully-automated systems based around computers, sonars, cameras, sensors, satellite signals, and communication networks may be a big step, especially for people, who have driven for a lifetime. These passengers (i.e., former drivers) may know, first hand, the complexity, potential hazards, and "unwritten" rules of driving that they have personally relied upon for achieving safety, comfort, efficiency, and "driving the right way." They may know, intuitively, what "correct driving" feels like, and, for many, this may "correct driving" may feel like the way that they drive. So, conversion to autonomous vehicles may present a challenge for gaining trust and acceptance of passengers, who are former, long-time drivers. However, a pathway for gaining this trust and acceptance may be found in developing ways for autonomous vehicles to mimic the feel of "correct driving" for these new passengers by imitating their driving style.

Figure 2A:
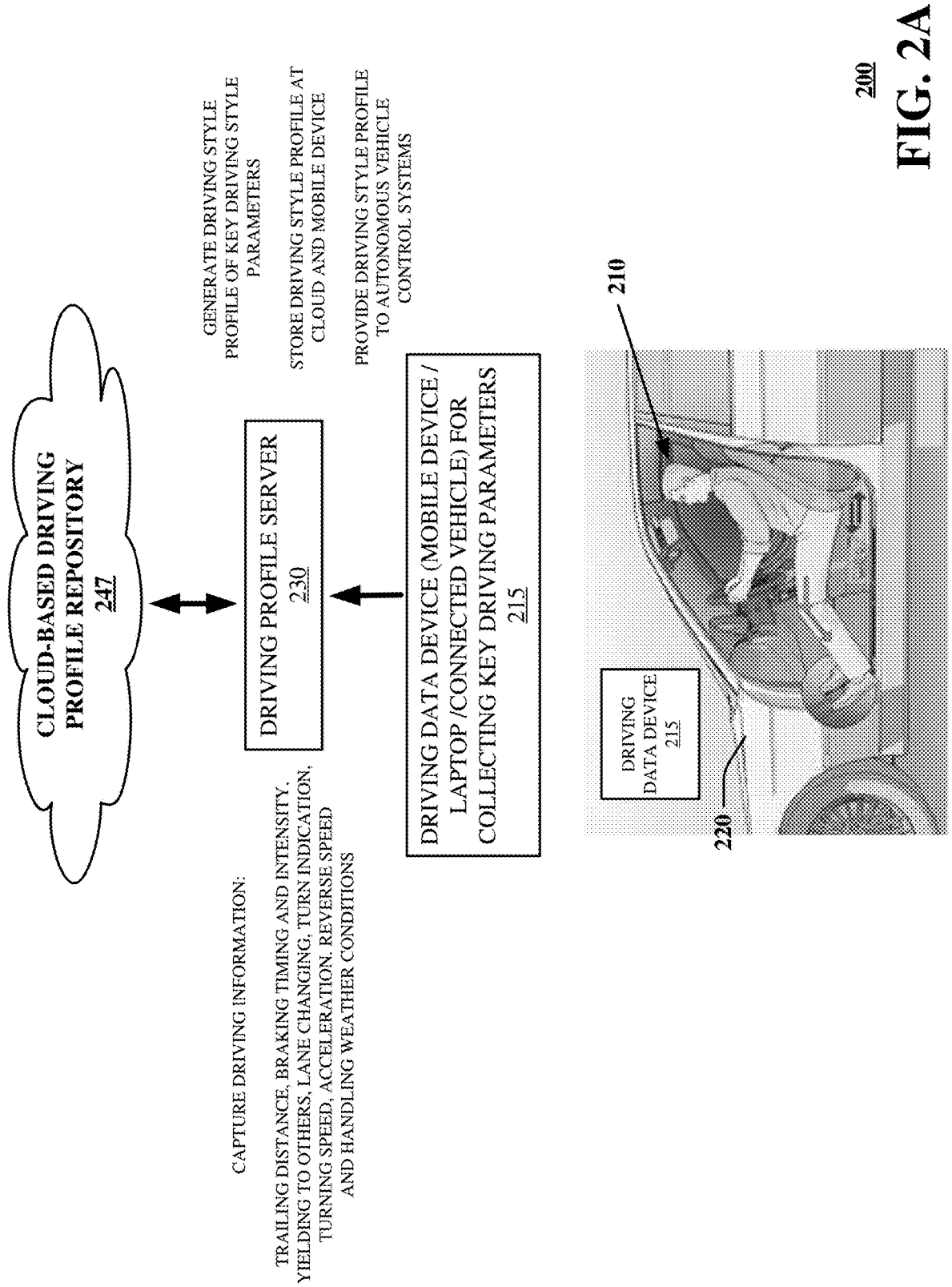
FIG. 2A is a block diagram illustrating an example, non-limiting embodiment of a system for determining personalized driving style profiles functioning within the communication network of FIG. 1 in accordance with various aspects described herein.

FIG. 2A is a block diagram illustrating an example, non-limiting embodiment of a system determining personalized driving style profiles functioning within the communication network of FIG. 1 in accordance with various aspects described herein. In one or more embodiments, a system 200 can determine a personalized driving style profile of a driver 210, where that personalized driving style profile can be used in an autonomous vehicle control system to mimic this driving style when the driver is a passenger in the autonomous vehicle. In one embodiment, the system 200 can include a driving profile server (DPS) 230. In one embodiment, the DPS 230 can monitor various parameters indicative of how a driver 210 approaches driving a vehicle. These parameters can include such factors as vehicle acceleration, deceleration, signaling, distances from other vehicles or objects or traffic markers, lane changing, reversing, parking, and/or road conditions.

In one embodiment, the DPS 230 can capture this driving information during actual driving of a vehicle 220 by the driver 210. In one embodiment, the DPS 230 can couple into an existing control system in the vehicle 220 to capture real-time data for acceleration, deceleration, speed, braking, and so forth. If the vehicle includes systems for capturing sonar information and/or visual imaging, the DPS 230 can capture this information as well. In one embodiment, the DPS 230 can capture all or a portion of these parameters by coupling to a set of specialized sensors that are placed onto the vehicle 220 for the purpose of this monitoring function. For example, the vehicle 220 can be outfitted with a set of sensors (accelerometers, cameras, sonar, etc.,) for a temporary monitoring function for characterizing the person's driving over a period of time. For example, the DPS 230 can monitor actual driving by the driver 210 for a day or a week in order to capture various types of driving conditions typical to that driver. In one embodiment, the driving information can be captured at an autonomous vehicle 220 while that vehicle 220 is operating in manual-driving mode. The autonomous vehicle 220 can access the resources of its autonomous system—its sensors, sonars, cameras, and so forth—to capture all of this driving information while the driver is actually driving the vehicle 220. In one embodiment, the DPS 230 can capture other data such as weather conditions, location and/or map information, traffic information, and/or time day information. The DPS 230 can use this additional information to build a context for the driving information that is captured during the real-world driving session.

In one embodiment, the DPS 230 can capture this driving information via a simulated vehicle 220 and/or simulated driving. Future autonomous vehicles may or may not include means for manual driving. Capturing this driving information from a driver executing a simulated, self-drive driving course can provide an efficient and safe means for capturing driving habits and responses. For example, the simulated driving sequence can provide various weather conditions, road conditions, traffic, pedestrians, urban, rural, and/or highway conditions over a condensed period of minutes. Whereas achieving this range of driving situations can be impractical using real-world driving of an actual vehicle 220. Simulated driving also allows for capture of driving information in a standardized way that can make analysis easier and more predictable. In one embodiment, the simulated vehicle can be a specialized simulator device, such as the type of devices used for training pilots to fly airliners. In one embodiment, the simulated vehicle can be implemented mostly or entirely via software. A driver 210 can engage the simulated driving experience via a personal computer or laptop or smart device in a method similar to playing a video game on the device. Instead of a steering wheel and accelerator/brake pedal, the driver 210 can "drive" the simulated vehicle using typical computer controls (keyboard, mouse, etc.,). However, the simulation would encourage the driver 210 to drive in a way that is consistent with how they drive their own vehicle. The simulated driving software can capture the same type of driving information (acceleration, braking distance, etc.,) that would be captured if driving a real vehicle, but the captured data would actually be simulated data.

In one or more embodiments, the DPS 230 can analyze the driving profile information that has been captured during the vehicle driving session, whether the driving profile information is captured via a real vehicle 220, a simulator vehicle 220, a software-based simulation, or a combination of these tools. The DPS 230 can use a machine learning based application or a machine learning engine. The DPS 230 can digest the driving information from the vehicle driving session into a set of key driving style parameter values for this driver 210. The key driving style parameters can be collated into a personalized driving style profile. This profile can be stored at a cloud-based driving profile repository 247 for future access. The profile can also be stored on a mobile device, such as the personal mobile device of the driver to provide portability, so that the driver can apply this profile to any autonomous vehicle in which they ride as a passenger. In one or more embodiments, the personalized driving style profile can be used to model a driving style. The personalized driving style profile can be standardized so that one or more autonomous control systems for autonomous vehicles can use the contents of the profile. For example, the personalized driving style profile could include a set of standard parameters, such as factors for typical acceleration, braking distance, distance when following a vehicle, and so forth. These standard parameters can map out a range of behaviors for this driver, which can be a subset of the available safe performance range for an autonomous control system model.

A personalized "riding" style profile can similarly be generated for a person, who is typically a passenger in a self-driving vehicle in which a different human driver is the pilot. The personalized riding style profile can represent a "riding style" that reflects how this person is accustomed to experiencing the passenger experience when another driver/human pilot is in charge. In one or more embodiments, a passenger can record, edit, view, and apply riding experiences with another human/pilot at the helm to form their personalized riding style profile, which can be made available to an autonomous vehicle whenever this individual is a passenger of the autonomous vehicle.

Figure 2B:
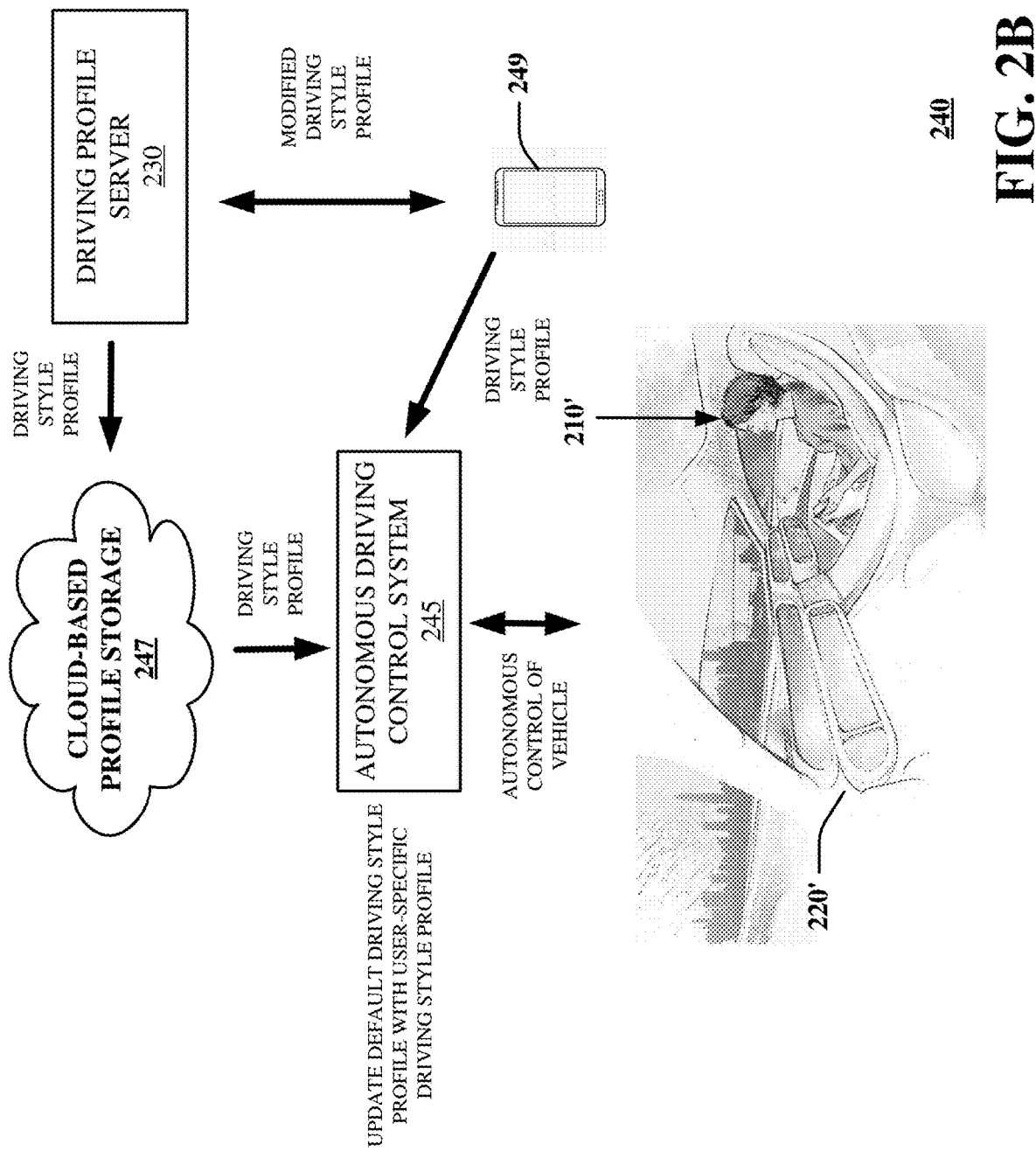
FIG. 2B is a block diagram illustrating an example, non-limiting embodiment of a system for using personalized driving style profiles in an autonomous vehicle and functioning within the communication network of FIG. 1 in accordance with various aspects described herein.

FIG. 2B is a block diagram illustrating an example, non-limiting embodiment of a system 240 for using personalized driving style profiles in an autonomous vehicle 220' and functioning within the communication network of FIG. 1 in accordance with various aspects described herein. In one or more embodiments, the DPS 230 can provide the personalized driving style profile for a passenger 210' to an autonomous driving control system 245. In one or more embodiments, the autonomous driving control system 245 can access the personalized driving style profile directly from storage at a network cloud. For example, the DPS 230 can register the personalized driving style profile for a particular autonomous vehicle passenger 210' (i.e., former self-drive driver) with a network cloud-based driving profile repository 247. The autonomous driving control system 245 can determine an identity of a passenger 210', using, for example, a biometric recognition marker such as a voice print. Once the identity of the passenger 210' is known, the autonomous driving control system 245 can query the cloud-based driving profile repository 247 for a personalized driving style profile associated with that identity. In one example, the autonomous vehicle 220' may be identified to the passenger 210', such as when the autonomous vehicle 220' is their personal vehicle. In another example, a mobile device 249 of the passenger 210' can provide the passenger's identity to the autonomous driving control system 245. In another example, such as when the autonomous vehicle 220' is being dispatched to the passenger 210' from a ride hailing system, the ride hailing system can query the cloud-based driving profile repository 247 prior to arrival to pick up the passenger 210'.

In one or more embodiments, the personalized driving style profile for the passenger 210' can stored on a mobile device 249 of the passenger 210'. For example, after the DPS 230 determines a personalized driving style profile for a driver 210, the DPS 230 can send the profile to a mobile device 249 designated by the driver 210. In one example, an application running at the mobile device 249 can download the personalized driving style profile for this driver from the DPS 230 or from the cloud-based driving profile repository 247. When this driver 220 is now a passenger 210' entering an autonomous vehicle 220', the application in the mobile device 249 can automatically connect with the autonomous vehicle 220', such as via a local area network (LAN), a WiFi connection, a Bluetooth™ connection, or some other wireless connection of the autonomous vehicle 220'. The mobile device 249 can share the personalized driving style profile of the passenger 210' with the autonomous vehicle 220'. The mobile device 249 can also be used by the passenger 210' to share this personalized driving style profile with any autonomous vehicle 220', whether it be a personal vehicle, a fleet vehicle, a ride hailing system vehicle, or a vehicle belonging to someone else (a friend's vehicle).

In one or more embodiments, the passenger 210' can further access their personalized driving style profile via the application on their mobile device, or any other computing device, to review, edit, update, and validate the settings of their personalized driving style profile. For example, the passenger 210' can compare their personalized driving style profile to a default driving style profile, or to a "best in class" profile. The passenger 210' can decide to change one or more values in the personalized driving style profile. For example, the passenger 210' may find that, after riding in an autonomous vehicle 220' for a while, they are comfortable with the process and would be fine adopting a default driving style profile or would simply like to change a profile setting, such as a longer-than-average acceleration time. The application can allow the passenger 210' to update settings and to propagate the updated settings to the DPS 230 and/or the cloud-based driving profile repository 247. In one embodiment, the application can require an authentication from the passenger 210' to ensure that the requested update is coming from the registered passenger 210'. In one embodiment, the application can validate a proposed update to the personalized driving style profile using a verification algorithm. For example, a proposed change might conflict with an allowed safe range of settings for the autonomous driving control system 245 or for a particular autonomous vehicle 220'. In one embodiment, the application can delay changes to the personalized driving style profile while the passenger 210' is currently riding in the autonomous vehicle 220' These changes can be validated and saved for a later time, such as the beginning of the next ride session, to ensure safe operation of the vehicle 220'.

In one or more embodiments, after the autonomous driving control system 245 has loaded a personalized driving style profile for a passenger 210', the autonomous driving control system 245 can validate the personalized driving style profile against a verification algorithm. The autonomous driving control system 245 can verify that the personalized driving style profile matches the passenger 210'. For example, a user or mobile device identifier can be obtained from the mobile device 249. The personalized driving style profile can include a copy of this identifier, which can be compared by the autonomous driving control system 245 during authentication. For example, biometrics could be used to authenticate the passenger 210' using voice print, finger print, and/or retinal scan. In another example, the autonomous driving control system 245 can validate the personalized driving style profile against the cloud-based driving profile repository 247 to authenticate the identity of the passenger 210', the mobile device 249, or both. In one embodiment, the autonomous driving control system 245 can validate the parameters and values in the personalized driving style profile using an algorithm that checks for reasonableness and/or safety of the values. For example, the autonomous driving control system 245 can have a checking algorithm that checks each personalized driving style profile against a set of value ranges that are within the safe and acceptable capability of the autonomous vehicle 220'. If a setting in the personalized driving style profile of the passenger 210' exceeds a range limit of the checking algorithm, then the autonomous driving control system 245 can flag the error and inform the passenger 210' of the issue. The autonomous driving control system 245 can reject the personalized driving style profile altogether or, alternatively, the autonomous driving control system 245 can correct one or more settings in the personalized driving style profile so that they are within acceptable ranges.

In one or more embodiments, once the autonomous driving control system 245 has accepted and/or corrected the personalized driving style profile for the passenger 210', the autonomous driving control system 245 can modify its own default driving style profile according to the personalized driving style profile for the passenger 210'. In one example, the autonomous driving control system 245 can replace its default driving style profile entirely with the personalized driving style profile for the passenger 210'. In another example, the autonomous driving control system 245 can simply update aspects of its default driving style profile with those parts of the personalized driving style profile for the passenger 210' that differ from the default driving style profile. In one embodiment, the default driving style profile can include a much larger set of parameters than the personalized driving style profile. In such case, only those parameters in the personalized driving style profile would need to be changed in the default driving style profile. Once the default driving style profile has been updated, the autonomous driving control system 245 can control the operation of the autonomous vehicle 220' using the modified default driving style profile. This operation should mimic the self-drive driving style of the driver 210, who is now the autonomous vehicle passenger 210' so as to provide performance that is familiar and/or comforting to the passenger 210'

In one or more embodiments, the resulting autonomous vehicle performance can thereby be shaped to closely reflect the familiar, personalized driving style of the autonomous vehicle passenger based on their self-drive driving style. Accordingly, as the passenger 210' experiences the performance of the autonomous vehicle, the passenger 210' can feel more comfortable. In one or more embodiments, the personalized driving style profile can be applied to a vehicle that is partially, but not fully autonomous. For example, a partially-autonomous vehicle can include a lane keep assistance function and/or an adaptive cruise control function. A control system for such a vehicle can access, from a personalized driving style profile, one or more parameters that can be used by the control system to modify performance of the partial-autonomous function. For example, the control system can use a parameter associated with vehicle distance from a passenger's personalized driving style profile to modify vehicle distance performance in its adaptive cruise control function. The resulting adaptive cruise control performance can be more comfortable or agreeable for the driver 210 of the partially-autonomous vehicle 220. Whether the vehicle is partially or fully autonomous, modification of performance to mimic the driver's driving performance can provide personalization that aids comfort, safety, trust, and acceptance of the automation. By comparison, providing a passenger 210' with a "one size fits all" approach can increase anxiety, reduce comfort, and result in reduced adoption of automation, especially among experienced drivers.

The personalized driving style profile is portable and can be applied other autonomous vehicles. The profile enables autonomous vehicles that feel "correct" while avoiding vehicle performance that feels wrong or scary or that produces anxiety in passengers. In various embodiments, piloting style profiles for boating or flying applications can similarly provide a pathway for transitioning from piloting a marine or aerial vehicle to riding in an autonomously piloted marine or aerial vehicle.

Figure 2C:
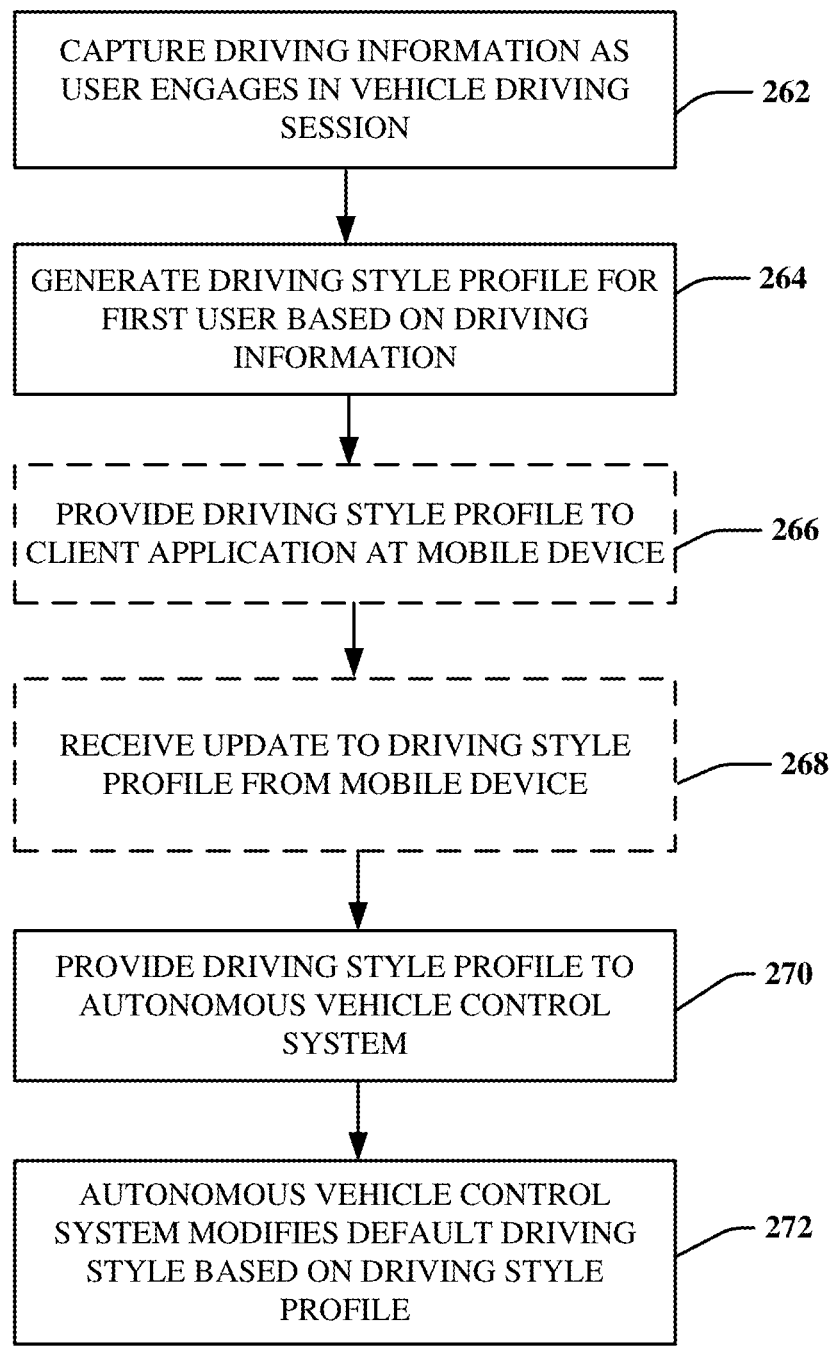
FIG. 2C depicts an illustrative embodiment of a method in accordance with various aspects described herein.

FIG. 2C depicts an illustrative embodiment of a method in accordance with various aspects described herein. The method 260 is an illustrative embodiment of a process for determining a personalized driving style profile for a driver and providing this profile for use at an autonomous vehicle when the driver becomes a passenger in the autonomous vehicle. In step 262, a driving profile server can capture driving information as a driver engages in a vehicle driving session. The driving session can include actual real-world driving of a vehicle, driving of a vehicle simulator, interaction with vehicle simulation software, or a combination of these approaches. In step 264, the driving profile server can generate a personalized driving style profile from the captured driving information. The personalized driving style profile can include parameters and values for modeling, mimicking, or replicating the driving style of the driver when that driver is a passenger of an autonomous vehicle. In optional steps 266 and 268, the driving profile server can provide the personalized driving style profile to a client application at a mobile device. The mobile device, in turn, can update the personalized driving style profile by editing the parameters or values. The updated personalized driving style profile can by uploaded to the driving style profile server. In step 270, the personalized driving style profile can be provided to an autonomous vehicle control system. The personalized driving style profile can be sent directly from the driving style profile server or can be provided by a cloud-based profile storage or a mobile device of a passenger. In step 272, the autonomous vehicle control system can modify a default driving style profile based on the personalized driving style profile.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
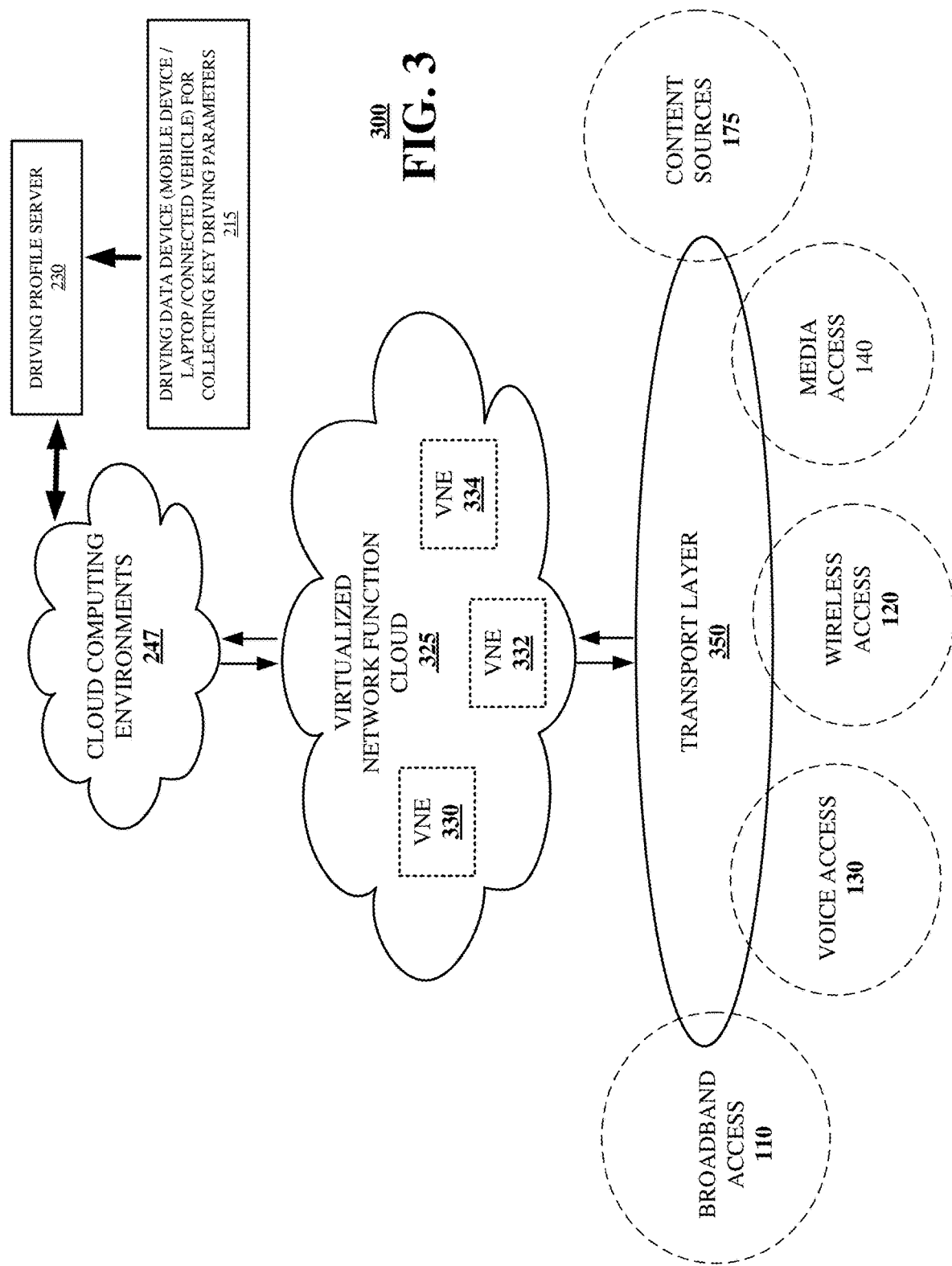
FIG. 3 is a block diagram illustrating an example, non-limiting embodiment of a virtualized communication network for storage of a driving style profile database in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 230 presented in FIGS. 1, 2A, 2B, 2C, and 3. For example, virtualized communication network 300 can facilitate in whole or in part capturing driving information for a driver during a vehicle driving session, generating a personalized driving style profile for the first driver based on the driving information, and providing the personalized driving style profile to an autonomous vehicle control system to mimic or closely replicate a driving style of the driver at an autonomous vehicle.

In particular, a cloud computer storage to cloud storage architecture is shown that leverages cloud technologies and supports rapid innovation and scalability via a transport layer 350, a virtualized network function cloud 325 and/or one or more cloud-based driving style profile repositories 247. In various embodiments, this cloud storage architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations. In one or more embodiments, the cloud storage architecture can store personalized driving style profiles and can make these profiles available to autonomous vehicles and/or to smart devices.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads. In one or more embodiments, autonomous vehicles and/or passenger smart devices can be connected to a virtualized communication network. As the number of autonomous vehicles and/or smart devices in an area serviced by the communication network vary over time, the virtualization feature allows the virtualized communication network to dynamically allocate and reallocate resources to accommodate these changes.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage. In one or more embodiments, the virtualized communication network can assign a set of network elements for providing personalized driving style profiles to autonomous vehicles and, at a later time, reassign those network element resources to a different use. For example, addition resources can be assigned during peak transportation periods, such as morning or afternoon "rush hour," and, then, reassigned to other uses during non-peak transportation periods.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350. For example, some network elements used for providing access to personalized driving style profiles may be positioned near shopping areas or office buildings, where may autonomous vehicles and passengers may converge during peak transportation hours. These network elements may be reassigned for other uses, such as providing network services to shoppers, employees, and/or businesses during non-peak transportation hours.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services. For example, providing access to personalized driving style profiles may not be a particularly data intensive task for a virtualized communication network (when compared, for example, to highly intensive tasks such as streaming media content). Therefore, virtualized network elements that are assigned to this task may well be additionally assigned to other tasks and/or may each be assigned to only provide a small portion of overall throughput for providing these profiles.

The cloud-based driving style profile repository 247 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud-based driving style profile repository 247 and in the commercial cloud, or might simply orchestrate workloads supported entirely in NFV infrastructure from these third party locations. In one or more embodiments, an cloud-based driving profile repository 247 and/or a driving profile server 230 may use API functions to access personalized driving style profiles stored in cloud-based profile storage.

Figure 4:
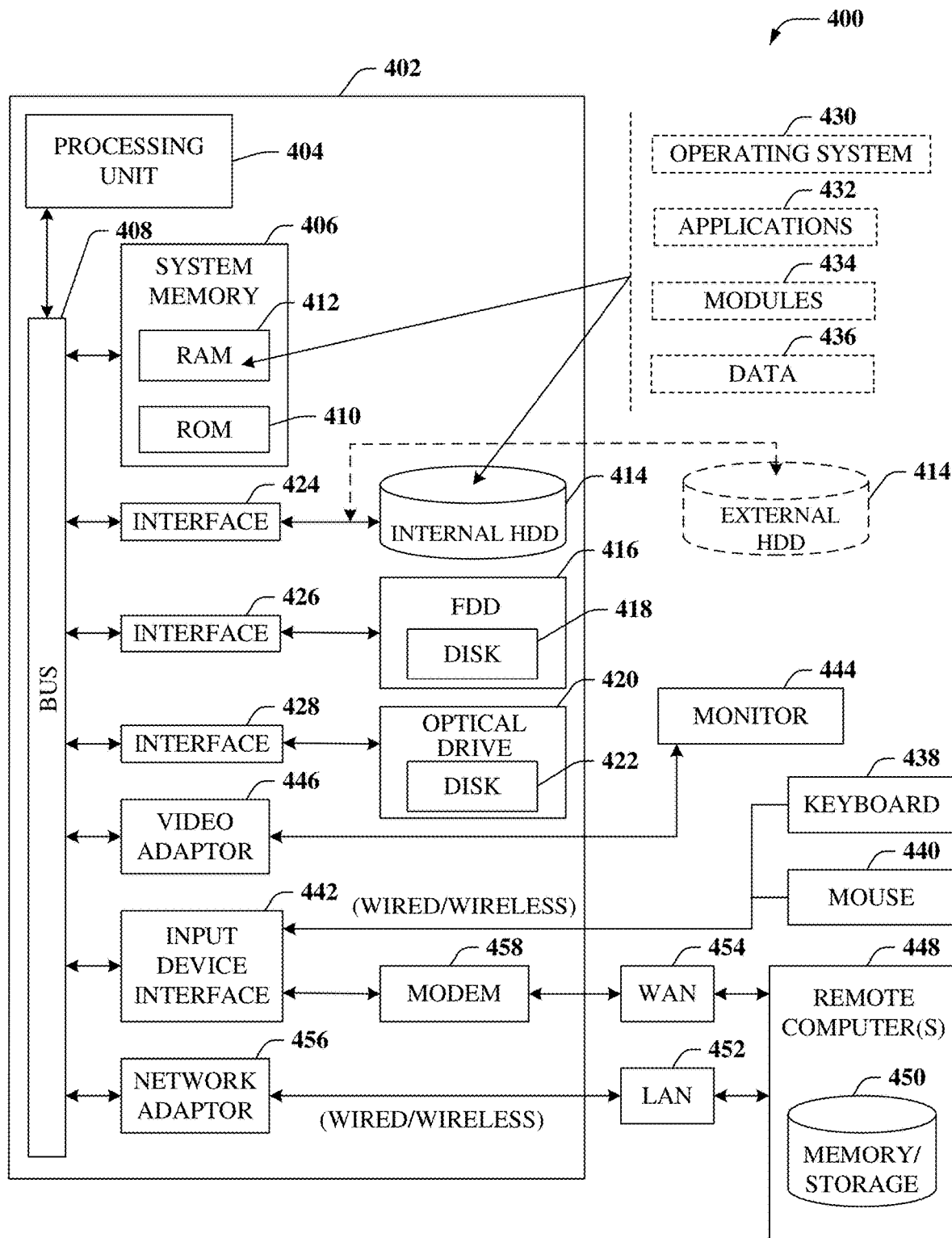
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of cloud-based driving profile repository 247, a driving profile server 230, network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part capturing driving information for a driver during a vehicle driving session, generating a personalized driving style profile for the first driver based on the driving information, and providing the personalized driving style profile to an autonomous vehicle control system to mimic or closely replicate a driving style of the driver at an autonomous vehicle.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium. For example, computing devices at autonomous vehicles and smart devices may use computer-readable storage in the performance of operations such as accessing personalized driving style profiles.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc. For example, a passenger can access a personalized driving style profile stored on a smart device. The passenger can view, edit, and update the profile via a touch panel display on the smart device.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet. In one or more embodiments, a driving profile server 230 can communicate with a mobile device 249 of a passenger 210' via a communication network, such as the Internet or a virtual private network (VPN).

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (WiFi) and BLUETOOTH® wireless technologies. Thus, the communication can be a predefined structure as with a conventional network or simply an ad hoc communication between at least two devices.

WiFi can allow connection to the Internet from a couch at home, a bed in a hotel room or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, ac, ag, etc.) to provide secure, reliable, fast wireless connectivity. A WiFi network can be used to connect computers to each other, to the Internet, and to wired networks (which can use IEEE 802.3 or Ethernet). WiFi networks operate in the unlicensed 2.4 and 5 GHz radio bands for example or with products that contain both bands (dual band), so the networks can provide real-world performance similar to the basic 10BaseT wired Ethernet networks used in many offices. In one or more embodiments, a mobile device 249 of a passenger 210' of an autonomous vehicle 220' can access a driving profile server 230 via a local WiFi network at a premises of the passenger 210'. The passenger 210' can use this connection to modify their personalized driving style profile and save the modified version at the driving profile server 230 and a cloud-based driving profile repository 247. Further, an autonomous vehicle 220', particularly a personal vehicle, can be configured to connect to a local WiFi—such as when the vehicle is parked in the garage. The autonomous vehicle 220' can access a personalized driving style profile and/or update its operating software via the local WiFi connection.

Figure 5:
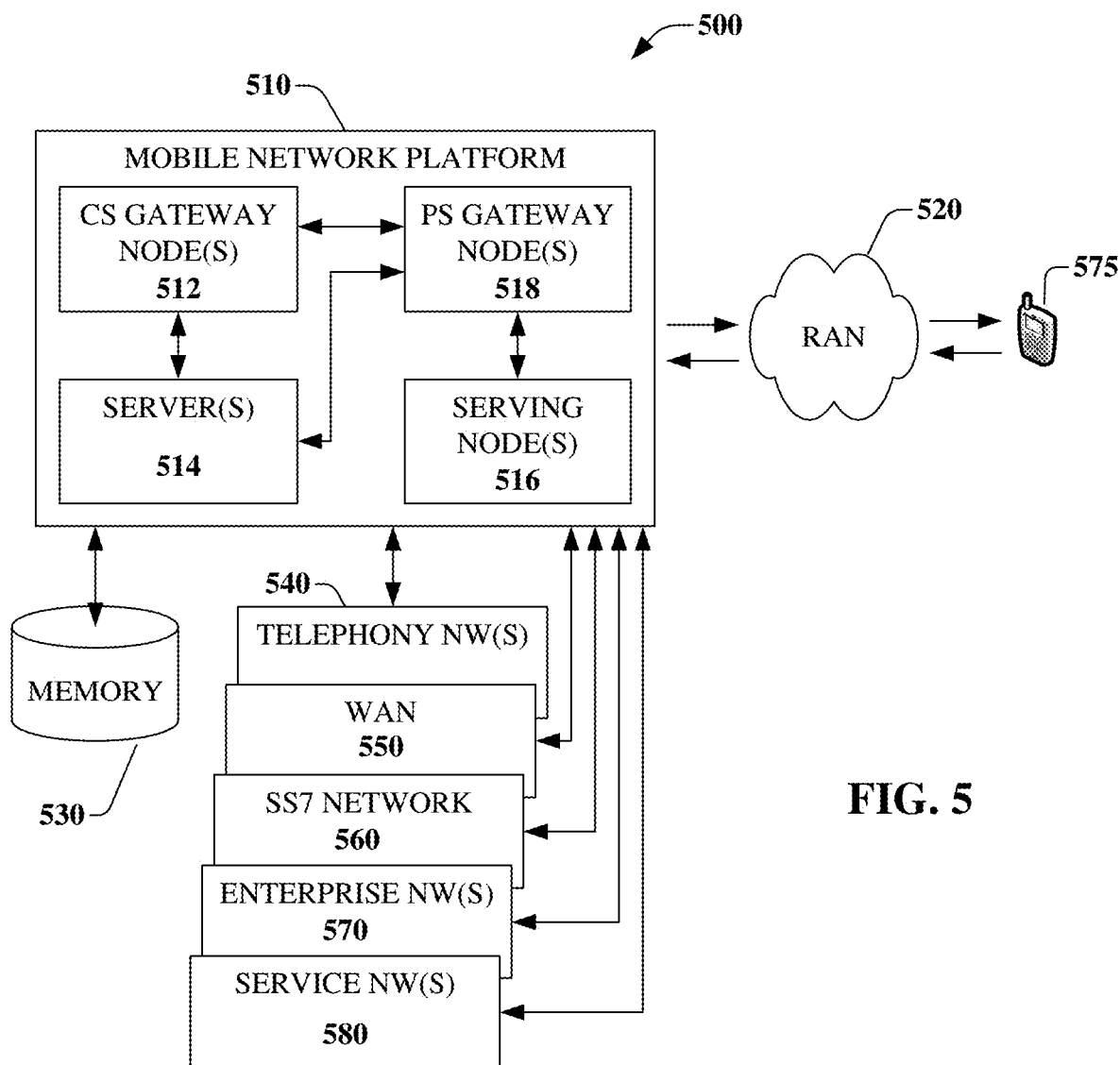
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, capturing driving information for a driver during a vehicle driving session, generating a personalized driving style profile for the first driver based on the driving information gathered during the driving session or simulation, and providing the personalized driving style profile to an autonomous vehicle control system to mimic or closely replicate a driving style of the driver at an autonomous vehicle. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). As a further example, system 500 can implement "3GPP 5G" features for achieving 5G "new radio" (5G NR), such as those described in release 15 of the 3GPP standard. The 3GPP 5G implementation can include enhanced mobile broadband (eMBB), capable of delivery of 10 Gbps, ultra-reliable low latency communications (URLLC) and massive machine type communication (mMTC), wider bandwidths, network capacity extension, and/or advanced signal processing practices for achieving 5G NR. It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as WiFi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN). As a further example, system 500 can implement "3GPP 5G" features for achieving 5G "new radio" (5G NR), such as those described above.

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
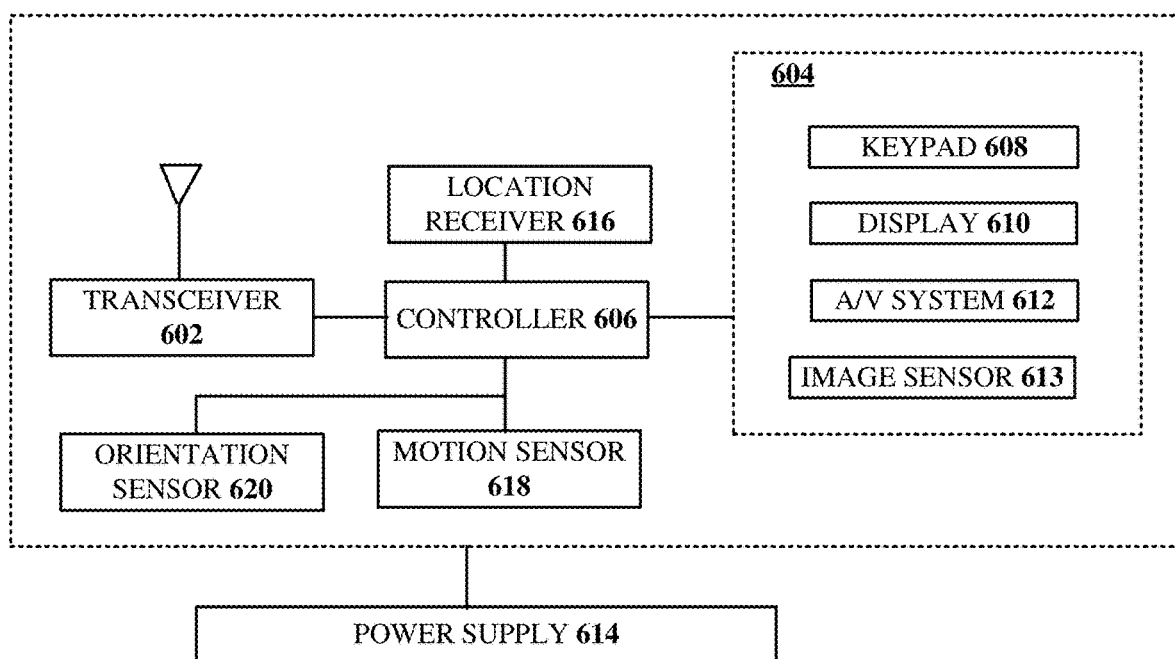
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, a connected vehicle 126, display devices 144 or other client devices for communication via either communications network 125. For example, computing device 600 can facilitate, in whole or in part, capturing driving information for a driver during a vehicle driving session or simulation, generating a personalized driving style profile for the first driver based on the driving information, and providing the personalized driving style profile to an autonomous vehicle control system to mimic or closely replicate a driving style of the driver at an autonomous vehicle. In one embodiment, the communication device 600 can facilitate relay of a personalized driving style profile to a cloud storage device and/or to a mobile storage device associated with the driver.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, 5G, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can include a finger print authentication scanner or sensor. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images. The image sensor 613 can include a retinal scanner for obtaining biometric authentication information.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, cloud computing resources, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth. For example, observation and collection of driving style information can be performed with a driver's authorization. This information can be used to generate a personalized driving style profile.

Some of the embodiments described herein can also employ artificial intelligence (AI) to facilitate automating one or more features described herein. In one or more embodiments, the driving profile server 230 can use machine learning to determine a personalized driving style profile for a driver based on driving style information. The driving style information can be collected during one or more real world driving session or can be collected during driving simulations. In one or more embodiments, the machine learning can employ various AI-based schemes for carrying out various embodiments thereof. Moreover, a classifier can be employed. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining parameters of a personalized driving style profile based on analyzing driving style information.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, an application running on a cloud computer resource, and/or a computer. By way of illustration and not limitation, both an application running on a server and the server can be a component. One or more components may reside within a process and/or thread of execution and a component may be localized on one computer and/or distributed between two or more computers and/or reside in a container or virtual machine on a cloud computing resource. In addition, these components can execute from various computer readable media having various data structures stored thereon. The components may communicate via local and/or remote processes such as in accordance with a signal having one or more data packets (e.g., data from one component interacting with another component in a local system, distributed system, a cloud-based system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or humans using artificial intelligence (e.g., a capacity to make inference based, at least, on complex mathematical formalisms), which can provide autonomous control, simulated driving styles, simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; parallel platforms with distributed shared memory; and cloud-based platforms. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
        capturing first driving information associated with a first driver, wherein the capturing the first driving information comprises monitoring vehicle context and control information during a vehicle driving session, wherein the vehicle driving session comprises operation, by the first driver, of a driving simulator in a non-autonomous mode, wherein the vehicle context and control information includes signaling information, distances from a plurality of objects, distances from a plurality of traffic markers, reversing, and parking, and wherein during the vehicle driving session the first driver is presented with a plurality of weather conditions in each of an urban setting and a rural setting and pedestrians in the urban setting;
        generating a personalized driving style profile associated with the first driver according to the first driving information, wherein the personalized driving style profile includes a set of key driving style parameter values associated with the first driver;
        comparing the set of key driving style parameter values to a set of safe value ranges;
        determining that a first key driving style parameter value of the set of key driving style parameter values is outside a first safe value range of the set of safe value ranges;
        adjusting the first key driving style parameter value to fall within the first safe value range responsive to determining that the first key driving style parameter value is outside the first safe value range;
        updating the personalized driving style profile according to a modification to the personalized driving style profile associated with the first driver, wherein the modification is received from an application at a mobile communication device of the first driver;
        facilitating communication between the mobile communication device of the first driver and an autonomous vehicle control system of an autonomous ride hailing vehicle via a ride hailing application; and
        facilitating upload of the personalized driving style profile associated with the first driver from the mobile communication device to the autonomous vehicle control system of the autonomous ride hailing vehicle responsive to the facilitating the communication, wherein the autonomous vehicle control system modifies a default driving style algorithm of the autonomous vehicle control system according to the personalized driving style profile to mimic, at the autonomous ride hailing vehicle, a driving style of the first driver during operation of the autonomous ride hailing vehicle.

2. The device of claim 1, wherein the updating the personalized driving style profile is contingent upon authentication of the first driver, and wherein the operations further comprise comparing biometric data associated with the first driver for the authentication of the first driver.

3. The device of claim 2, wherein the updating the personalized driving style profile is contingent upon a safety verification of the modification of the personalized driving style profile.

4. The device of claim 2, wherein the biometric data includes a voice print, a finger print, and a retinal scan, and wherein at the autonomous ride hailing vehicle the autonomous ride hailing vehicle uses a parameter associated with vehicle distance included in the personalized driving style profile to facilitate an adaptive cruise control function.

5. The device of claim 1, wherein the generating the personalized driving style profile is via a machine learning engine.

6. The device of claim 1, wherein the operations further comprise storing the personalized driving style profile associated with the first driver at a network cloud portal, wherein the ride hailing application at the mobile communication device accesses the personalized driving style profile from the network cloud portal.

7. The device of claim 1, wherein the capturing the first driving information during the vehicle driving session comprises capturing simulated data from the driving simulator.

8. The device of claim 1, wherein the driving simulator is operated by the first driver via inputs and output of a computer device.

9. The device of claim 1, wherein the vehicle driving session comprises operation of a software-based driving simulation for non-autonomous driving.

10. The device of claim 1, wherein the vehicle context and control information includes acceleration, deceleration, lane changes, turning, or any combination thereof.

11. The device of claim 1, wherein the vehicle context and control information includes vehicle presence.

12. The device of claim 1, wherein the autonomous vehicle control system further modifies the default driving style algorithm within traffic rules and safety margins.

13. A non-transitory machine-readable medium, comprising executable instructions that, when executed by a processing system including a processor, facilitate performance of operations, the operations comprising:

capturing first driving information associated with a first driver, wherein the capturing the first driving information comprises monitoring vehicle context and control information during a vehicle driving session, wherein the vehicle driving session comprises operation, by the first driver, of a driving simulator in a non-autonomous mode, wherein the vehicle context and control information includes signaling information, distances from a plurality of objects, distances from a plurality of traffic markers, reversing, and parking, and wherein during the vehicle driving session the first driver is presented with a plurality of weather conditions in each of an urban setting and a rural setting and pedestrians in the urban setting;

generating a personalized driving style profile associated with the first driver according to the first driving information, wherein the personalized driving style profile includes a set of key driving style parameter values associated with the first driver, and wherein the generating the personalized driving style profile is via a machine learning engine;

comparing the set of key driving style parameter values to a set of safe value ranges;

determining that a first key driving style parameter value of the set of key driving style parameter values is outside a first safe value range of the set of safe value ranges;

adjusting the first key driving style parameter value to fall within the first safe value range responsive to determining that the first key driving style parameter value is outside the first safe value range;

facilitating communication between a mobile communication device of the first driver and an autonomous vehicle control system of an autonomous ride hailing vehicle via a ride hailing application; and facilitating upload of the personalized driving style profile associated with the first driver from the mobile communication device to the autonomous vehicle control system of the autonomous ride hailing vehicle responsive to the facilitating the communication, wherein the autonomous vehicle control system modifies a default driving style algorithm of the autonomous vehicle control system according to the personalized driving style profile to mimic, at the autonomous ride hailing vehicle, a driving style of the first driver during operation of the autonomous ride hailing vehicle.

14. The non-transitory machine-readable medium of claim 13, wherein the vehicle driving session comprises operation of a software-based driving simulation for non-autonomous driving.

15. The non-transitory machine-readable medium of claim 13, wherein the operations further comprise updating the personalized driving style profile according to a modification to the personalized driving style profile received via an application at the mobile communication device.

16. The non-transitory machine-readable medium of claim 15, wherein the operations further comprise storing the personalized driving style profile associated with the first driver at a network cloud portal, wherein the application at the mobile communication device accesses the personalized driving style profile from the at a network cloud portal.

17. The non-transitory machine-readable medium of claim 13, wherein the vehicle context and control information includes acceleration, deceleration, or any combination thereof.

18. The non-transitory machine-readable medium of claim 13, wherein the vehicle context and control information includes vehicle presence.

19. A method, comprising:

facilitating, by a processing system at a ride hailing autonomous vehicle including a processor, communication with a mobile communication device of a first driver via a ride hailing application;

receiving, by the processing system at the ride hailing autonomous vehicle, a personalized driving style profile associated with the first driver from the mobile communication device responsive to the facilitating the communication, wherein the personalized driving style profile includes a set of key driving style parameter values associated with the first driver derived from monitoring vehicle context and control information captured during a vehicle driving session, wherein the vehicle driving session comprises operation, by the first driver, of a driving simulator in a non-autonomous mode, wherein the vehicle context and control information includes signaling information, distances from a plurality of objects, distances from a plurality of traffic markers, reversing, and parking, wherein during the vehicle driving session the first driver is presented with a plurality of weather conditions in each of an urban setting and a rural setting and pedestrians in the urban setting, wherein a first key driving style parameter value of the set of key driving style parameter values is adjusted to fall within a first safe value range of a set of safe value ranges responsive to determining that the first key driving style parameter value is outside the first safe value range; and modifying, by the processing system at the ride hailing autonomous vehicle, a default driving style algorithm according to the personalized driving style profile to mimic, at the ride hailing autonomous vehicle a driving style of the first driver during operation of the ride hailing autonomous vehicle.

20. The method of claim 19, wherein the vehicle context and control information includes acceleration, deceleration, lane changes, turning, or any combination thereof.

* * * * *